United States Patent [19]
Bhore et al.

[11] Patent Number: 5,741,469
[45] Date of Patent: Apr. 21, 1998

[54] PROCESS SCHEME FOR SO$_x$ REMOVAL FROM FLUE GASES

[75] Inventors: Nazeer A. Bhore, Wilmington, Del.; David L. Johnson, Glen Mills, Pa.; Khushrav E. Nariman, Lawrenceville; David L. Stern, Princeton, both of N.J.

[73] Assignee: Mobil Oil Corporation, Fairfax, Va.

[21] Appl. No.: 727,843

[22] Filed: Oct. 4, 1996

Related U.S. Application Data

[63] Continuation of Ser. No. 278,523, Jul. 20, 1994, abandoned.

[51] Int. Cl.$^6$ .................................. B01J 8/00; C01B 7/00
[52] U.S. Cl. .................... 423/244.01; 423/244.02; 423/244.07; 423/541.1; 423/569
[58] Field of Search .................. 423/244.09, 244.01, 423/244.02, 243.12, 529, 541.1, 578.4

[56] References Cited

U.S. PATENT DOCUMENTS

| | | | |
|---|---|---|---|
| 3,755,535 | 8/1973 | Naber | 423/244 |
| 4,283,380 | 8/1981 | Voirin et al. | 423/574 R |
| 4,323,544 | 4/1982 | Magder | 423/239 |
| 4,497,902 | 2/1985 | Bertolacini et al. | 423/244.09 |
| 4,725,417 | 2/1988 | Deschamps et al. | 423/244 |
| 4,728,635 | 3/1988 | Bhattacharyya | 423/244.02 |
| 4,790,982 | 12/1988 | Yoo et al. | 423/239 |
| 4,836,993 | 6/1989 | Bertolacini et al. | 423/244.02 |
| 5,057,205 | 10/1991 | Chin et al. | 208/121 |
| 5,229,091 | 7/1993 | Buchanan et al. | 423/244.01 |

FOREIGN PATENT DOCUMENTS

| | | |
|---|---|---|
| WO 87/06156 | 10/1987 | European Pat. Off. |
| 521912 | 7/1976 | U.S.S.R. ............ 423/578.4 |
| 1154009 | 6/1969 | United Kingdom ... 423/244.1 |
| 2190683 | 11/1987 | United Kingdom ... 423/244.1 |

*Primary Examiner*—Gary P. Straub
*Attorney, Agent, or Firm*—Penny L. Prater; Malcolm D. Keen

[57] ABSTRACT

A dry, regenerable solid oxide process directed to convert SO$_x$ from the flue gas stream from a power plant, a coal or oil-fired plant or process heat furnace, or an FCC regenerator to elemental sulfur without using a Claus unit, a hydrogen plant, a regeneration gas separation system, or a hydrogenation section. This dry, regenerable solid oxide process is also effective on Claus plant tail-gas. This process uses solid oxides, such as, for example, magnesium aluminates or spinels to remove sulfur oxides from flue gas streams. The solid oxide is then regenerated by a reducing gas to release the sulfur compounds contained on the solid oxide to produce a gas stream comprising hydrogen sulfide, sulfur oxides and elemental sulfur. The elemental sulfur is then condensed and recovered as a product and the resulting gas stream may be recycled to be reprocessed over the solid oxide.

27 Claims, 1 Drawing Sheet

PROCESS SCHEME FOR SO$_x$ REMOVAL FROM FLUE GASES

This is a continuation of application Ser. No. 08278,523, filed on Jul. 20, 1994, now abandoned.

FIELD OF THE INVENTION

The present invention is directed to a dry solid oxide process to convert SO$_x$ from the flue gas stream from a power plant, a coal or oil-fired plant, an FCC regenerator, or a process heat furnace to elemental sulfur without using a Claus unit, a hydrogen plant, a regeneration gas separation system, or a hydrogenation section. The present invention is also effective to treat Claus plant tail-gas. The process of this invention uses solid oxides, such as, for example, magnesium aluminates or spinels.

BACKGROUND OF THE INVENTION

Concentrations of sulfur oxides in flue gases may be reduced or handled through the use of lower sulfur fuels, taller stacks or one or more sulfur removal processes. Generally, the use of lower sulfur fuel is not attractive either due to economics or due to regulatory considerations. The use of taller stacks alters the dispersion characteristics of the emitted sulfur oxides, but does nothing to remove sulfur oxides from the flue gas. Sulfur oxide removal processes may be broadly classified as wet scrubbing processes or dry processes. The most popular commercial processes have been those based upon the use of lime or limestone. These processes have included both wet scrubbing of the flue gas and dry lime addition to the combustion bed, with the wet scrubbing processes the most popular. In the wet lime/limestone scrubbing processes, the flue gas is contacted with an aqueous slurry of lime or limestone and optionally, magnesium sulfate, to remove sulfur dioxide from the flue gas. In these processes, the sulfur dioxide reacts with the lime/limestone slurry and oxygen to form calcium sulfite and calcium sulfate. The amount of oxygen in the flue gas determines the amount of calcium sulfate formed. The solid compounds (calcium sulfite and calcium sulfate) are collected and must be disposed of according to local environmental regulations. No sulfur is typically recovered in these processes. In addition to generating undesirable solid waste, these wet flue gas treatment processes cool the flue gas down, thereby decreasing the potential plume rise of the flue gas or necessitating expensive flue gas reheat to achieve an acceptable plume rise.

Other processes for the treatment of flue gases containing relatively low concentrations of sulfur compounds include, for example, dry and liquid phase processes for catalytic conversion of H$_2$S and SO$_2$ to elemental sulfur, catalytic hydrogenation and hydrolysis of sulfur compounds into H$_2$S for further processing, and oxidation of all sulfur compounds into SO$_x$ for further processing by adsorption in dry processes or absorption in wet processes. Many of these processes produce liquid, semi-liquid or solid waste streams that must be disposed of or treated. Other flue gas treatment processes require use of additional expensive process units, for example, regeneration gas concentrations systems, hydrogen plants, and hydrogenation systems to recover the sulfur as elemental sulfur.

One example of a dry process to remove sulfur oxides from flue gases is a dry, regenerable flue gas treatment process, the Shell Flue Gas Desulfurization (SFGD) process. This process is exemplified in U.S. Pat. No. 3,764,665 to Groenendaal et al. A block flow diagram of this process applied to removal of sulfur oxides from power plant flue gases is shown in FIG. 1 (*Chemical Engineering Progress*, Vol. 67, 1971, p. 86). In this process, the power plant flue gases are directed via line into the SFGD 2 where the sulfur oxides are chemisorbed as metal sulfates. The treated flue gas, which has a lower sulfur oxide concentration than the inlet flue gas, is directed out of the SFGD 2 via line 3. Fuel gas is directed via line 5 along with steam via line 6 into a hydrogen plant 10 where hydrogen is produced, typically using a steam reforming process. After the SFGD 2 bed is saturated with metal sulfates, hydrogen produced in the hydrogen plant 10 is directed via line 11 into the SFGD 2 to regenerate the sulfated solid oxide and to produce sulfur dioxide which is directed out of the SFGD 2 via line 15 to the Regeneration Gas Separation System 16. In the Regeneration Gas Separation System 6, the concentration of sulfur dioxide in the regeneration gas stream from the SFGD 2 is increased by removing water and any unreacted hydrogen. Water must be removed from the regeneration gas stream so that high sulfur conversions may be obtained in the downstream Claus Plant 35. The concentrated sulfur dioxide stream produced in the Regeneration Gas Separation System 6 is directed via line 7 out of the Regeneration Gas Separation System 6. Part of the concentrated sulfur dioxide stream flowing in line 17 is directed via line 18 to a Hydrogenation Section 25, where the sulfur dioxide is hydrogenated to form hydrogen sulfide using hydrogen directed via line 12 from the Hydrogen Plant 10. Water is then separated from the hydrogen sulfide stream. The hydrogen sulfide stream is directed out of the Hydrogenation Section 25 via line 26 where it combines with the sulfur dioxide stream flowing in line 17 and then is directed into the Claus Plant 35 for recovery of elemental sulfur. The elemental sulfur leaves the Claus Plant 35 via line 36.

As is evident from this block flow diagram, a number of process units, such as hydrogen plants, regeneration gas separation systems, hydrogenation sections and Claus plants are required with some dry regenerative sulfur dioxide removal processes, such as the SFGD process, to convert the sulfur dioxide contained in flue gas to elemental sulfur.

SUMMARY OF THE INVENTION

It is an object of the present invention to provide an improved process to remove contaminants such as sulfur oxides from flue gases and other waste gas streams by removing the sulfur oxides from the gas streams and then producing elemental sulfur, which can be recovered as a product, rather than creating byproducts requiring disposal as a solid waste.

Another object of the present invention is to enable recovery of sulfur oxides from flue gas and the production of elemental sulfur without the need for additional process units, such as, hydrogen plants, regeneration gas concentration systems, hydrogenation sections, and Claus plants.

Another object of the present invention is the concentration of the off-gas stream containing the recovered sulfur oxides to allow additional processing, if desired, without an intervening concentration step.

Another object of the present invention is the removal of sulfur oxides from flue gas without the production of undesirable liquid, semi-liquid or solid waste that must be disposed of or subsequently treated.

In accordance with the present invention, there is provided an improved process for removing low concentrations of sulfur oxides from gas streams such as power plant flue gases, FCC regenerator flue gases, heater and boiler flue gases, and combustion off-gases without using a hydrogen plant, a regeneration gas separation system, a hydrogenation section or a Claus plant (including the tail-gas unit, if present). The present invention is also effective to treat Claus plant tail-gas.

When the process of this invention is used as a Claus plant tail-gas treater, it is effective to reduce or eliminate recycle of sulfur containing gases back to the parent Claus plant.

The process of this invention can also be used to remove sulfur oxides from FCC regenerator flue gases, fired heater flue gases, and boiler flue gases without increasing the load on existing sulfur recovery facilities, such as Claus plants.

This invention involves the use of a solid oxide, such as, for example, a magnesium aluminate or a spinel, to remove sulfur oxides from flue gas streams from a power plant, a coal or oil fired plant, a process heat furnace, or an FCC regenerator. The present invention is also effective to treat Claus plant tail-gas. The solid oxide is then regenerated by a reducing gas, e.g., hydrogen, carbon monoxide, synthesis gas, or gas produced by substoichiometric burners, to release the sulfur compounds contained on the solid oxide to produce an off-gas stream comprising hydrogen sulfide, sulfur oxides and elemental sulfur. The elemental sulfur is then condensed and recovered as a product and the resulting tail-gas stream is recycled back to be reprocessed over the solid oxide.

An advantage of the use of this invention is that sulfur oxides may be removed from the gas without the generation of undesirable liquid, semi-liquid, or solid waste.

As a result of the present invention, the removal of contaminants from flue gases or waste gases using a gas-solid reaction system is significantly improved.

An embodiment of this invention is a process for removing sulfur oxides from a flue gas stream, which comprises: (a) directing the flue gas stream containing sulfur oxides along with a source of oxygen into an absorber, wherein the gas stream contacts a solid oxide operated under conditions effective to remove substantially all of the sulfur oxides from the flue gas stream, thereby producing a sulfated solid oxide containing sulfur compounds thereon; (b) ceasing contact of the gas stream and the source of oxygen with the solid oxide; (c) regenerating the solid oxide by contacting it with a reducing gas capable of releasing at least a portion of the sulfur compounds contained thereon as elemental sulfur under conditions effective for regeneration of the solid oxide, thereby forming a regenerated solid oxide and an off-gas comprising elemental sulfur; (d) directing said off-gas into a condenser operated at conditions effective for condensing elemental sulfur, thereby forming a product stream comprising elemental sulfur and a tail-gas stream; and (e) directing said tail-gas stream into said absorber with said flue gas stream and said source of oxygen.

DETAILED DESCRIPTION OF THE INVENTION

Figure 1:
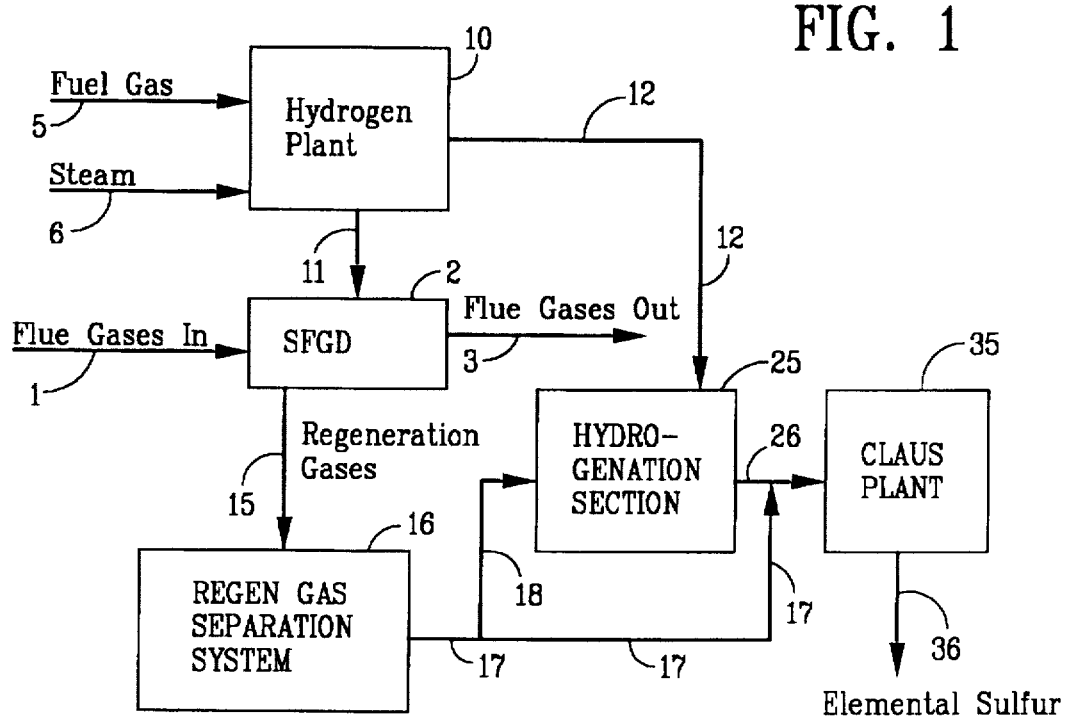
FIG. 1 is a block flow diagram of a dry, regenerative system to adsorb sulfur oxides from flue gas and to produce elemental sulfur.

This invention comprises an improved process for removing sulfur oxides from a flue gas stream by directing the flue gas stream containing sulfur oxides along with a source of oxygen into an absorber, wherein the gas stream contacts a solid oxide operated under conditions effective to remove substantially all of the sulfur oxides from the flue gas stream, thereby producing a sulfated solid oxide containing sulfur compounds thereon. As used herein, removal of substantially all of the sulfur compounds from the flue gas generally means that at least about 80% of the sulfur compounds are removed, e.g., at least about 90%, e.g., at least about 95%, e.g., only about 2 to about 5 ppm sulfur compounds remain in the treated flue gas stream leaving the absorber. After which, contact between the solid oxide and the sulfur oxide and oxygen containing gas is terminated. Non-limiting examples of flue gas streams that may be treated by the process of this invention include gases from power plants, coal, gas, and oil fired plants (e.g., heaters and boilers), process heat furnaces, FCC regenerators, or the tail-gas from Claus plants.

Next, the solid oxide is regenerated by contacting it with a reducing gas capable of releasing at least a portion of the sulfur compounds contained thereon as elemental sulfur, thereby forming an off-gas comprising elemental sulfur and forming a regenerated solid oxide. Non-limiting examples of suitable reducing gases include at least one of hydrogen, hydrocarbons, carbon monoxide, synthesis gas, or gas produced by substoichiometric combustion, and mixtures thereof. The off-gas may also contain at least one of hydrogen sulfide, carbon disulfide, sulfur dioxide, and mixtures of these with elemental sulfur. The off-gas may also contain unconverted reducing gas and water vapor.

Then, the off-gas is directed into a cooler or sulfur condenser operated at conditions effective to condense elemental sulfur but not water, thereby forming a product stream comprising elemental sulfur and a tail-gas stream. The tail-gas stream can contain hydrogen sulfide, sulfur dioxide, carbon disulfide, carbonyl sulfide, water vapor, inert gases, and unconverted reducing gas, and mixtures thereof along with elemental sulfur.

Finally, the regenerated solid oxide is returned into contact with the sulfur oxide and oxygen containing gas. The tail-gas stream is directed into the absorber along with the sulfur oxide containing flue gas and the source of oxygen.

The catalytic functioning of dry solid oxides for applications involving the reduction of sulfur oxides to elemental sulfur and or $H_2S$, or the concentration of sulfur oxides for subsequent reaction in a downstream processing unit may be broadly typified by the reaction scheme illustrated below.

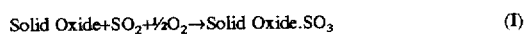

Solid Oxide+$SO_2$+½$O_2$→Solid Oxide.$SO_3$  (I)

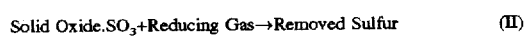

Solid Oxide.$SO_3$+Reducing Gas→Removed Sulfur  (II)

"Reduced Solid Oxide"+$O_2$→Solid Oxide  (III)

Reaction I indicates the oxidative reaction of $SO_2$, which is thought to occur via the oxidation of sulfur oxide mixtures (i.e., $SO_2$ and $SO_3$) and the combination of the $SO_3$ with the solid oxide on the catalyst. In the open literature, this has been called "Catalyst Sulfation," and after the combination with the solid oxide, the sulfur oxide-containing material is commonly called a "Sulfated Catalyst." As used herein "sulfation" is intended to refer both to chemisorption, such as would include sorption of $SO_3$, and physisorption, such as might be depicted M.$SO_3$, where M is the sorbent.

Reaction II involves the reduction or regeneration of the so-called sulfated catalyst. The sulfur oxides are released primarily as a mixture of $SO_2$, elemental sulfur, $H_2S$, and other sulfur containing compounds. The reaction also leads to a solid oxide which reacts with oxygen and thus is termed a "Reduced Solid Oxide." A partial list of gases generally considered as reductants suitable to induce the release of the sulfur compounds are hydrogen containing streams (e.g., steam reformer or naphtha reformer hydrogen, catalytic hydrogenation unit purge streams, etc.), and hydrocarbons such as propane.

Reaction III represents the oxidative calcination of the "Reduced Solid Oxide." It may be the reaction of air or other suitable oxidizing media with the reduced solid oxide, and yields a calcined solid oxide which may undergo more cycles of reactions I through II above. If desired, reaction III may be combined with reaction I to eliminate one processing step.

The configuration of this invention is flexible. For example, the flue gas stream may be directed into an incinerator along with an oxygen source to oxidize all or substantially all the sulfur compounds therein to sulfur oxides, then fed to the absorber. As used herein, conversion of substantially all of the sulfur compounds into sulfur oxides generally means that at least about 80% of the sulfur compounds are converted, e.g., at least about 90%, e.g., at least about 95%. The tail-gas stream may be recycled back to the incinerator to oxidize all or substantially all of the sulfur compounds in that stream. Alternatively, if no oxidation of the flue gas stream is required, the tail-gas may be directed to an incinerator to oxidize the sulfur compounds to sulfur oxides and then fed to the absorber along with the flue gas stream and a source of oxygen. Small amounts of tail-gas may also be directed to the absorber without incineration. The amount of tail-gas that may be directed to the absorber without incineration is dependent upon the resulting temperature change across the solid oxide bed due to the oxidation of sulfur compounds contained in the tail-gas. More tail-gas may be recycled directly to the absorber when the flue gas flow rate is high, a large mass of solid oxide is used or the concentration of oxidizable sulfur compounds in the tail-gas is low.

An advantage of this invention is that the elemental sulfur in the off-gas produced by the regeneration of the solid oxide generally comprises about 50% to about 100%, e.g., about 60% to about 90%, e.g., about 70 to about 80%, of the sulfur compounds in the off-gas stream. Also, as mentioned above, the process of this invention recovers the sulfur oxides from the flue gas and then converts sulfur compounds that are present on the solid oxide to products comprising elemental sulfur, thus allowing conversion of sulfur oxides into a recoverable product, elemental sulfur, rather than the production of undesirable waste.

This invention may be useful in combination with a recent process disclosed in commonly assigned U.S. Pat. No. 5,229,091 to Buchanan et al., incorporated herein by reference, which increases the loading capability of a solid oxide to over 60 weight percent $SO_3$ on solid oxide. This patent discloses the use of a solid oxide and discloses the use of hydrogen and/or hydrocarbons as reducing gases.

Figure 2:
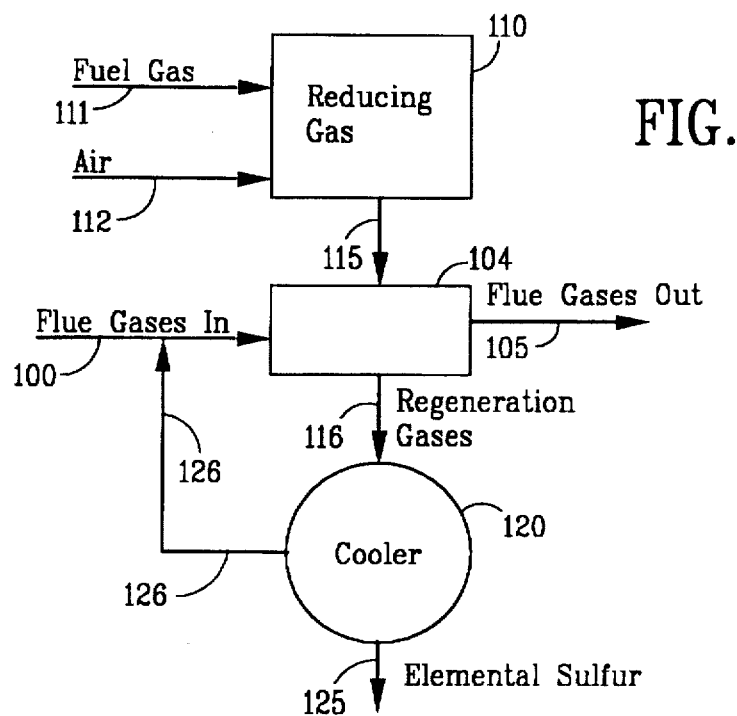
FIG. 2 is a block flow diagram of a system for converting sulfur oxides in flue gas to elemental sulfur in accordance with the present invention.

One possible embodiment of this invention is shown in block form in FIG. 2. In this embodiment, flue gas containing sulfur compounds is directed via line 100 into a solid oxide sulfur oxide adsorption process 104 substantially as described in the Buchanan et al. patent (U.S. Pat. No. 5,229,091) where the sulfur compounds are adsorbed. The treated flue gases which are substantially free of sulfur compounds are directed away from the solid oxide process 104 via line 105. Fuel gas is directed into a Reducing Gas Generator 110 via line 111. Air is also directed into the Reducing Gas Generator 110 via line 112. The fuel gas and air react in the Reducing Gas Generator 110 via partial oxidation to produce synthesis gas comprising hydrogen, carbon monoxide and mixtures thereof. Naturally, if a gas stream comprising at least one of hydrogen or carbon monoxide, or both, is available for use in this process, the reducing gas generator 10 may be omitted. After the solid oxide in the adsorption process 04 is substantially sulfated, synthesis gas from the Reducing Gas Generator 110 is directed via line 115 to the adsorption process 104 to regenerate the solid oxide. Regeneration off-gas from the adsorption process 104 comprising elemental sulfur is directed via line 116 to a cooler 120 for the condensation and recovery of elemental sulfur. Elemental sulfur is withdrawn from the cooler 120 via line 125. Uncondensed tail-gas is withdrawn from the cooler 120 via line 126 and is directed to line 100 where it is combined with flue gas and is recycled to the adsorption process 104.

The cooler 120 is generally operated at a temperature of about 250° F. to about 350° F. and a pressure of about 0.1 to about 10 atmospheres, e.g., from about 280° F. to about 320° F. and about 1 to about 5 atmospheres, e.g., about 290° F. to about 310° F. and about 1 to about 3 atmospheres, to condense elemental sulfur without condensing water. In the practice of this invention, intermediate heat recovery is possible between the adsorption process 104 and the cooler 120, whereby energy is removed from the process at higher temperature levels than that of the cooler 120.

If the flue gas to be treated in this process contains sulfur compounds that have already been substantially converted to sulfur oxides, the incinerator mentioned in the above referenced U.S. Pat. No. 5,229,091 may be eliminated and the flue gas directed straight to the absorber. The uncondensed tail gas from the process of the present invention, flowing in line 126, may be directed to the absorber or to an incinerator (not shown) along with a source of oxygen to oxidize the sulfur compounds contained therein. After incineration, the incinerated tail-gas product would be fed to the absorber along with the flue gas feed flowing in line 100.

If desired, the tail-gas stream flowing through line may be directed to other processing units, rather than recycled to the adsorption process 104.

The regeneration gas may be injected into the bed of sulfated solid oxide in multiple locations in the bed of sulfated solid oxide, for example, the regeneration gas may be injected in at least two, specifically in at least three, more specifically in at least four, most specifically in at least five levels located successively longitudinally through the bed. Each of the injection locations may also independently comprise at least one, specifically at least two, more specifically three or more injection points at each successive level in the bed of sulfated solid oxide. An embodiment of the regeneration gas injection system includes a process wherein the sulfated solid oxide referred to herein is contained in a bed and wherein the regeneration gas is contacted with the sulfated solid oxide by injecting through at least one injection point located on each of a plurality of different levels located longitudinally through the bed of solid oxide. The regeneration gas may be directed to all of the injection points on all of the levels simultaneously. Alternatively, the regeneration gas may be directed, using a suitable control system, to selected injection points or to all of the injection points on selected levels, for example, the regeneration gas could be directed first to some or all of the injection points located at the level closest to the exit of the bed, then sequentially to some or all of the injection points located on levels away from the bed exit. An embodiment of this control scheme is one where the flow of regeneration gas is individually controlled through the injection points. An equivalent to the above described system of injection points would be a comparable system of gas exit points at multiple locations throughout the bed. Each of these systems of injection or exit points is intended to achieve the goal of increasing the yield of elemental sulfur.

The process of this invention may be heat integrated with other processing units, such as a Claus plant or other processing units. In addition to this external heat integration, the process of this invention, as mentioned herein may include internal heat integration, such as heaters for the desulfation gas and for the gas to be treated along with coolers for the treated gases and any coolers associated with the sulfur condensers used in this process.

This process is especially effective in treating acid gas containing, for example, hydrogen sulfide and other gases. This invention may be combined with other sour gas treatment units, for example, amine absorber-stripper systems and Claus units, to regenerably reduce total sulfur emissions. Acid gas, as described here, comprises hydrogen sulfide, carbon monoxide, carbon dioxide, methane, and possibly small amounts of other gases, such as nitrogen, hydrogen, heavier hydrocarbons, and other sulfur compounds.

This invention can be used to advantage with the catalyst being disposed in any conventional reactor-regenerator system, in ebullating catalyst bed systems, in systems which involve continuously conveying or circulating catalyst between reaction zone and regeneration zone, fixed bed systems and the like. Typical of the circulating catalyst bed systems are the conventional moving bed and fluidized bed reactor-regenerator systems. Both of these circulating bed systems are conventionally used in hydrocarbon conversion, e.g., hydrocarbon cracking.

The form and the particle size of the solid oxide are not critical to the present invention and may vary depending, for example, on the type of reaction-regeneration system employed. Non-limiting examples of the shapes for the solid oxide for use in the present invention include balls, pebbles, spheres, extrudates, channeled monoliths, microspheres, pellets or structural shapes, such as lobes, pills, cakes, powders, granules, and the like, formed using conventional methods, such as extrusion or spray drying. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized systems, the major amount by weight of the particles may have a diameter in the range of about 10 microns to about 250 microns, e.g., about 20 microns to about 150 microns.

The solid oxide useful in this invention typically has a surface area (by the conventional B.E.T. method) in the range of about 5 $m^2/gm$. to about 600 $m^2/gm$., e.g., about 15 $m^2/gm$. to about 400 $m^2/gm$., e.g., about 20 $m^2/gm$. to about 300 $m^2/gm$.

Non-limiting examples of suitable solid oxides for use in the present invention include the porous solids, alumina, silica, silica-alumina, natural and synthetic zeolites, activated carbon, spinels, clays and combinations thereof. Gamma ($\gamma$) alumina, chi-eta-rho ($\chi,\eta,\rho$) alumina, delta ($\delta$) alumina, and theta ($\theta$) alumina are particularly useful as solid oxides and supports because of their high surface areas. While alpha ($\alpha$) alumina and beta ($\beta$) alumina can be used as solid oxides herein, they are not as effective as gamma, chi-eta-rho, delta and theta alumina. One or more oxides of other metals can also be used as solid oxides, either alone or in combination with alumina or as spinels, such as, for example, bismuth, manganese, yttrium, antimony, tin, Group IA metals, Group IIA metals, rare earth metals, and combinations thereof. Magnesium aluminates are particularly useful in the method of this invention. These may be magnesium or aluminum rich with magnesium aluminate spinels preferred. Lanthanum and cerium are preferred rare earth metals. Naturally occurring rare earths, such as in the form of baestenite, are also useful solid oxides. Elemental copper or copper compound solid oxides, can also be used. The copper oxide can be cuprous oxide ($Cu_2O$) and/or cupric oxide (CuO). Other copper compounds can be used, such as copper (II) sulfate, copper (II) acetate, copper (II) formate, copper (II) nitrate and/or copper (II) chloride. The solid oxide can also be a blendmixture of high density and low density materials, such as of the above-identified metal oxides.

Also, a metal or metal oxide may be deposited on the solid oxide or may be used alone. The metal or metal oxide part of the solid oxide can be supported, carried and held on a refractory support or carrier material which also provides part of the solid oxide. The support controls the attrition and surface area characteristics of the solid oxide. The support typically has a surface area greater than about 10 $m^2/g$, e.g., from about 20 $m^2/g$ to about 500 $m^2/g$. Suitable supports include, but are not limited to, silica, alumina, silica-alumina, zirconia, titania, thoria, kaolin or other clays, diatomaceous earth, boria, and/or mullite. The support can comprise the same material as the metal or metal oxide part of the solid oxide.

The solid oxide may be combined with a matrix or binder, including the supports mentioned above, e.g., alumina. The solid oxide may also be used without a matrix or binder. The support material may also be present in the bed containing the solid oxide in particles separate from the particles of the solid oxide. Also, optionally present in the bed containing the solid oxide may be particles of an inert material, wherein the term "inert" is used to represent materials that are less effective when used in the sulfation/desulfation cycles described herein.

The solid oxide can be impregnated or otherwise coated with at least one oxidizing catalyst or promoter that promotes the removal of nitrogen oxides, the oxidation of $SO_2$ to $SO_3$ in the presence of oxygen, and the removal of the sulfur compounds from the solid oxide. It is believed that $SO_3$ is more readily combined with the solid oxide than $SO_2$. One useful catalyst is ceria (cerium oxide). Another useful catalyst is platinum. Yet another useful catalyst is vanadium. Other catalytic metals, both free and in a combined form, preferably as an oxide form, can be used, either alone or in combination with each other or in combination with ceria and/or alumina, such as rare earth metals, metals from Group VIII of the Periodic Table, chromium, vanadium, rhenium, tungsten, silver, and combinations thereof. The promoter can comprise the same material as the solid oxide. An even distribution of the promoter may be helpful to achieve best results and to minimize solid oxide erosion.

Useful Group IA metals include lithium, sodium, potassium, rubidium, and cesium. Useful Group IIA metals include magnesium, calcium, strontium, and barium. Useful Group VIII metals are the Group VIII noble metals (the platinum family of metals) including ruthenium, rhodium, palladium, osmium, iridium, and platinum. Also useful are Group IB and Group IIB metals. The rare earth metals are also useful and are referred to as the lanthanides. Suitable rare earth metals include lanthanum, cerium, praseodymium, neodymium, samarium, europium, gadolinium, terbium, dysprosium, holmium, erbium, thulium, ytterbium, and lutetium. The promoter may be selected from the rare earth metals, the platinum group metals and mixtures thereof. Particularly good results are achieved when the promoter is cerium and/or platinum, with cerium giving outstanding results.

A second promoter, if present, may be selected from the metal or the metal oxide form of iron, nickel, titanium, chromium, manganese, cobalt, germanium, tin, bismuth, molybdenum, antimony, vanadium and mixtures thereof. The second promoter may be selected from iron, nickel, cobalt, manganese, tin, vanadium and mixtures thereof. Additional metals may be also incorporated into the solid oxide. For example, the solid oxide may include small or trace amounts of additional metals or metal oxides, such as lanthanum, iron, sodium, calcium, copper, and titanium.

The specific amounts of the promoters included in the solid oxide, if present at all, may vary widely. The first promoter may be present in an amount between about 0.001% to about 20% by weight, calculated as elemental metal, of the solid oxide, and the second promoter may be present in an amount between about 0.001% to about 10% by weight, calculated as elemental metal, of the solid oxide. The solid oxide may include about 0.1% to about 20%, e.g., about 0.2% to about 20%, e.g., about 0.5% to about 15%, by weight of rare earth metal, calculated as elemental metal. Of course, if a platinum group metal is employed in the solid oxide, very much reduced concentrations (e.g., in the parts per thousand to parts per million (ppm) range) are employed. If vanadium is included as the second promoter, it may be present in an amount of about 0.01% to about 7%, e.g., about 0.1% to about 5%, e.g., about 0.5% to about 2% by weight of vanadium, calculated as elemental metal.

The promoters may be associated with the solid oxide using any suitable technique or combination of techniques; including, for example, impregnation, coprecipitation, ion-exchange and the like, well known in the art. Also, the promoters may be added during synthesis of the solid oxide. Thus, the promoters may be an integral part of the solid oxide or may be in a phase separate from the solid oxide (e.g., deposited on the solid oxide) or both. These metal components may be associated with the solid oxide together or in any sequence or by the same or different association techniques. Cost considerations favor the preferred procedure in which the metal components are associated together with the solid oxide. Impregnation may be carried out by contacting the solid oxide with a solution, e.g., an aqueous solution, of the metal salts.

It may not be necessary to wash the solid oxide after certain soluble metal salts (such as nitrate, sulfate or acetate) are added. After impregnation with the metal salts, the solid oxide can be dried and calcined to decompose the salts, forming an oxide in the case of a nitrate, sulfate or acetate.

The above-mentioned solid oxides are generally discussed in U.S. Pat. No. 4,692,318 which issued to Tolpin et al. on Sep. 8, 1987. This patent is hereby incorporated by reference herein.

In one general aspect, the present invention may involve use of a solid oxide which is represented by the following empirical formula

where the atomic ratio of x to y ranges from about 0.1 to about 10 and where z is at least as required to accommodate the valances of the Mg and Al components of the solid oxide. This solid oxide may have the spinel structure and may contain at least one of the promoters described above.

Metal-containing spinels according to the above empirical formula that are useful in the present invention include the alkaline earth metal spinels, in particular magnesium (first metal) and aluminum (second metal)-containing spinel. Other alkaline earth metal ions, such as calcium, strontium, barium and mixtures thereof, may replace all or a part of the magnesium ions. Similarly, other metal ions, such as iron, chromium, vanadium, manganese, gallium, boron, cobalt, Group IB metals, Group IVA metals, Group IVB metals, the platinum group metals, the rare earth metals Te, Nb, Ta, Sc, Zn, Y, Mo, W, Tl, Re, U, Th and mixtures thereof, may replace all or a part of the aluminum ions, e.g., only a part of the aluminum ions.

The metal-containing spinels useful in the present invention may be derived from conventional and well known sources. For example, these spinels may be naturally occurring or may be synthesized using techniques well known in the art. Thus, a detailed description of such techniques is not included herein. One process for preparing the solid oxide is presented in U.S. Pat. No. 4,728,635, the specification of which is incorporated by reference herein.

The Group IA, IIA, IB metals, Group IIB metals, Group IVA metals, Group IVB metals, and Group VIII metals referred to herein are those listed in the Periodic Table of the Elements in the *Handbook of Chemistry and Physics* (61st Edition).

Free magnesia and/or alumina (i.e., apart from the alkaline earth metal containing spinel) also may be included in the present solid oxide, e.g., using conventional techniques. For example, in one embodiment, the solid oxide preferably includes about 0.1% to about 30% by weight of free magnesia (calculated as MgO).

As mentioned above, potential solid oxides are magnesia rich, magnesium aluminate spinels. One example of such spinel is a commercial magnesia rich, magnesium aluminate spinel containing 0 to 100 wt.% excess magnesia, 5 to 15 wt.% cerium, and 1 to 5 wt.% vanadium. These solid oxides are substantially described in U.S. Pat. Nos. 4,790,982 to Yoo et al.; 4,472,267 to Yoo et al.; and 4,469,589 to Yoo et al. The disclosures of U.S. Pat. Nos. 4,790,982; 4,472,267; and 4,469,589 are herein incorporated by reference. In general, the magnesium aluminate spinels useful in the present invention may be prepared by methods which are conventional and well known in the art.

We claim:

1. A process for removing sulfur oxides from a flue gas stream, which comprises the steps of:

(a) directing the flue gas stream containing sulfur oxides along with a source of oxygen into an absorber, wherein the flue gas stream and the source of oxygen contact a bed of solid oxide operated under conditions effective to remove at least about 80 percent of the sulfur oxides from the flue gas stream, thereby producing a sulfated solid oxide having sulfur compounds thereon and a treated flue gas output stream;

(b) ceasing contact of the flue gas stream and the source of oxygen with the bed of sulfated solid oxide;

(c) regenerating the sulfated solid oxide by contacting the bed of sulfated solid oxide with a reducing gas capable of releasing at least a portion of the sulfur compounds contained thereon under conditions effective for regeneration of the solid oxide, the reducing gas being simultaneously injected through at least one injection point located on each of a plurality of different levels located longitudinally through the bed of solid oxide, thereby forming a regenerated solid oxide and an off-gas comprising elemental sulfur;

(d) directing said off-gas into a condenser operated at conditions effective for condensing elemental sulfur without condensing water, thereby forming (1) a product stream comprising elemental sulfur and (2) a tail-gas stream;

(e) recovering the elemental sulfur; and (f) supplying said tail-gas stream from step (d) directly into said absorber in step (a) with the flue gas stream and said source of oxygen.

2. The process according to claim 1 comprising supplying the flue gas stream along with a source of oxygen into an incinerator prior to supplying the incinerated flue gas stream into the absorber in step (a), said incinerator being operated under conditions effective to convert substantially all the sulfur in the flue gas stream to sulfur oxides.

3. The process according to claim 2 comprising supplying said tail-gas stream to the incinerator along with the flue gas stream and said source of oxygen.

4. The process according to claim 1 comprising supplying said tail-gas stream from the condenser into an incinerator in the presence of an oxygen source, said incinerator being operated under conditions to convert the sulfur compounds in said tail-gas stream to sulfur oxides and then supplying the incinerated tail-gas stream from the incinerator into said absorber along with the source of oxygen.

5. The process according to claim 1 wherein the reducing gas is selected from the group consisting of synthesis gas, hydrogen, hydrocarbons, carbon monoxide and mixtures thereof.

6. The process according to claim 1 wherein the solid oxide comprises a magnesium aluminate.

7. The process according to claim 1 wherein the solid oxide comprises a magnesium aluminate spinel.

8. The process according to claim 1 wherein the solid oxide comprises a magnesia rich, magnesium aluminate spinel.

9. The process according to claim 1 wherein the solid oxide comprises a spinel, said spinel comprising a first metal and a second metal and a promoter other than said first and second metals, the promoter being effective to promote the oxidation of $SO_2$ to $SO_3$ in the presence of oxygen.

10. The process according to claim 1 wherein the solid oxide is selected from at least one metal-containing spinel, said spinel comprising a first metal and a second metal, a first promoter other than said first and second metals, and a second promoter other than said first and second metals and first promoter, wherein said first promoter is selected from the group consisting of Group IB metals, Group IIB metals, the rare earth metals, the Platinum Group metals and mixtures thereof, and said second promoter is selected from the group consisting of iron, nickel, titanium, chromium, manganese, cobalt, germanium, tin, bismuth, molybdenum, antimony, vanadium, and mixtures thereof, the first promoter and the second promoter being effective to promote the oxidation of $SO_2$ to $SO_3$ in the presence of oxygen.

11. The process according to claim 1 in which said off-gas and said tail-gas each further comprises at least one of hydrogen sulfide, sulfur dioxide, carbonyl sulfide, carbon disulfide, and mixtures thereof.

12. The process according to claim 1 comprising operating the condenser in step (d) at a temperature of about 250° to about 350° F. and a pressure of about 0.1 to about 10 atmospheres.

13. The process according to claim 1 comprising regenerating the solid oxide at conditions effective to produce at least 50% of the sulfur compounds in the off-gas as elemental sulfur.

14. The process according to claim 1 further comprising controlling the flow of the feed gas through the injection points.

15. The process according to claim 1 and wherein particles of an inert material are also present in the bed of solid oxide.

16. The process according to claim 1 wherein the solid oxide is selected from at least one metal-containing spinel which includes a first metal and a second metal, a first promoter other than said first and second metals, and a second promoter other than said first and second metals and first promoter, wherein said first promoter is selected from the group consisting of Group IB metals, Group IIB metals, the rare earth metals, the Platinum Group metals and mixtures thereof, and said second promoter is selected from the group consisting of iron, nickel, titanium, chromium, manganese, cobalt, germanium, tin, bismuth, molybdenum, antimony, vanadium, and mixtures thereof, the first promoter and the second promoter being effective to promote the removal of sulfur compounds from the solid oxide in the presence of the reducing gas.

17. The process of claim 1 wherein the flue gas stream is from a power plant, a coal or oil-fired plant, an FCC regenerator or a process heat furnace.

18. The process according to claim 1 wherein the sulfur oxides are removed from the flue gas stream and are converted to elemental sulfur without using a Claus unit, a hydrogen plant, a regeneration gas separation system or a hydrogenation section.

19. A process for removing sulfur oxides from a flue gas stream, which comprises the steps of:

(a) directing the flue gas stream containing sulfur oxides along with a source of oxygen into an absorber, wherein the flue gas stream and the source of oxygen contact a bed of solid oxide operated under conditions effective to remove at least about 80 percent of the sulfur oxides from the flue gas stream, thereby producing a sulfated solid oxide having sulfur compounds thereon and a treated flue gas output stream;

(b) ceasing contact of the flue gas stream and the source of oxygen with the bed of sulfated solid oxide;

(c) regenerating the sulfated solid oxide by contacting the bed of sulfated solid oxide with a reducing gas capable of releasing at least a portion of the sulfur compounds contained thereon under conditions effective for regeneration of the solid oxide, thereby forming (1) a regenerated solid oxide and (2) an off-gas, wherein the bed of sulfated solid oxide is regenerated at conditions effective to produce at least 50% of the sulfur compounds in said off-gas as elemental sulfur (d) directing said off-gas into a condenser operated at conditions effective for condensing elemental sulfur without condensing water, thereby forming (1) a product stream comprising elemental sulfur and (2) a tail-gas stream;

(e) recovering the elemental sulfur; and (f) supplying said tail-gas stream from step (d) directly into said absorber in step (a) with the flue gas stream and said source of oxygen;

wherein the flue gas stream is from a power plant, a coal or oil-fired plant, an FCC regenerator or a process heat furnace, and wherein the sulfur oxides are removed from the flue gas stream and are converted to elemental sulfur without using a Claus unit, a hydrogen plant, a regeneration gas separation system or a hydrogenation section.

20. The process of claim 19 wherein the reducing gas is injected simultaneously through at least one injection point located on each of a plurality of different levels located longitudinally through the bed of solid oxide.

21. The process of claim 19 wherein the reducing gas is directed first to at least one injection point located at a level closest to the exit of the bed, then sequentially to at least one injection point located on each of a plurality of levels spaced away from the bed exit.

22. The process according to claim 19 wherein, prior to supplying said tail-gas stream into said absorber in step (a), the tail-gas stream is directed from the condenser into an incinerator in the presence of an oxygen source, and wherein said incinerator is operated under conditions to convert the sulfur in the tail-gas stream to sulfur oxides.

23. A process for removing sulfur oxides from a flue gas stream, which comprises the steps of:
- (a) directing the flue gas stream containing sulfur oxides along with a source of oxygen into an absorber, wherein the flue gas stream and the source of oxygen contact a bed of solid oxide operated under conditions effective to remove at least about 80 percent of the sulfur oxides from the flue gas stream, thereby producing a sulfated solid oxide having sulfur compounds thereon and a treated flue gas output stream;
- (b) ceasing contact of the flue gas stream and the source of oxygen with the bed of sulfated solid oxide;
- (c) regenerating the sulfated solid oxide by contacting the bed of sulfated solid oxide with a reducing gas capable of releasing at least a portion of the sulfur compounds contained thereon under conditions effective for regeneration of the solid oxide, the reducing gas being injected through at least one injection point located on each of a plurality of different levels located longitudinally through the bed of solid oxide, the reducing gas being directed first to the at least one injection point located at the level closest to the exit of the bed, then sequentially to the at least one injection point located on levels away from the bed exit thereby forming (1) a regenerated solid oxide and (2) an off-gas comprising elemental sulfur;
- (d) directing said off-gas into a condenser operated at conditions effective for condensing elemental sulfur without condensing water, thereby forming (1) a product stream comprising elemental sulfur and (2) a tail-gas stream;
- (e) recovering the elemental sulfur; and
- (f) supplying said tail-gas stream from step (d) directly into said absorber in step (a) with the flue gas stream and said source of oxygen.

24. The process of claim 23 wherein the flue gas stream is from a power plant, a coal or oil-fired plant, an FCC regenerator or a process heat furnace.

25. The process according to claim 23 wherein said bed of solid oxide is regenerated at conditions effective to produce at least 50% of the sulfur compounds in said off-gas as elemental sulfur.

26. The process according to claim 23 wherein, prior to supplying said tail-gas stream into said absorber in step (a), the tail-gas stream is directed from the condenser into an incinerator in the presence of an oxygen source, and wherein said incinerator is operated under conditions to convert the sulfur in the tail-gas stream to sulfur oxides.

27. The process according to claim 23 wherein the sulfur oxides are removed from the flue gas stream and are converted to elemental sulfur without using a Claus unit, a hydrogen plant, a regeneration gas separation system or a hydrogenation section.

* * * * *